US012695299B2

(12) United States Patent
Shuto

(10) Patent No.: US 12,695,299 B2
(45) Date of Patent: Jul. 28, 2026

(54) POWER SUPPLY SYSTEM, MOVING OBJECT, AND CONTROL METHOD OF POWER SUPPLY SYSTEM

(71) Applicant: HONDA MOTOR CO., LTD., Tokyo (JP)

(72) Inventor: Kenta Shuto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/091,070

(22) Filed: Mar. 26, 2025

(65) Prior Publication Data

US 2025/0309641 A1      Oct. 2, 2025

(30) Foreign Application Priority Data

Mar. 29, 2024      (JP) ................................. 2024-057124

(51) Int. Cl.
*H02J 1/08*          (2026.01)
*B64D 31/14*          (2006.01)
*H02J 1/14*          (2026.01)

(52) U.S. Cl.
CPC .............. *H02J 1/084* (2020.01); *B64D 31/14* (2013.01); *H02J 1/14* (2013.01); *B64D 2221/00* (2013.01)

(58) Field of Classification Search
CPC .. H02J 1/084; H02J 1/14; B64D 31/14; B64D 2221/00
See application file for complete search history.

(56) References Cited

U.S. PATENT DOCUMENTS

2010/0284117 A1    11/2010   Crane
2017/0327219 A1*   11/2017   Alber ...................... H02S 20/00
2022/0204173 A1*   6/2022    Barraco ................ B64D 47/00
2023/0318303 A1    10/2023   Mitani et al.

FOREIGN PATENT DOCUMENTS

JP          2022-529997 A        6/2022

OTHER PUBLICATIONS

Extended European Search Report dated Jul. 29, 2025 issued in corresponding European application No. 25167174.9; 9 pages.

* cited by examiner

*Primary Examiner* — Carlos Amaya
(74) *Attorney, Agent, or Firm* — Rankin, Hill & Clark LLP

(57)          ABSTRACT

A control device executes power consumption control for expedited decrease in voltage output from a second power storage device by supplying electric power from the second power storage device to a second power generation device, and thereafter executes connection control for connecting the first power supply circuit to a second power supply circuit via a connection circuit, in the case where electric power output from the second power generation device is required to be supplied to a first load device, and a subtraction value obtained by subtracting a voltage value of a first power supply circuit from a voltage value of a second power supply circuit is larger than a predetermined first threshold.

6 Claims, 10 Drawing Sheets

FIG. 2

POWER SUPPLY SYSTEM, MOVING OBJECT, AND CONTROL METHOD OF POWER SUPPLY SYSTEM

CROSS-REFERENCE TO RELATED APPLICATIONS

This application is based upon and claims the benefit of priority from Japanese Patent Application No. 2024-057124 filed on Mar. 29, 2024, the contents of which are incorporated herein by reference.

BACKGROUND OF THE INVENTION

Field of the Invention

The present disclosure relates to a power supply system, a moving object, and a control method of the power supply system.

Description of the Related Art

JP 2022-529997 A discloses an aircraft electrical energy supply network (power supply system).

SUMMARY OF THE INVENTION

There has been a demand for a more satisfactory power supply system, a more satisfactory moving object including the power supply system, and a more satisfactory control method of the power supply system.

The present invention has the object of solving the aforementioned problem.

According to a first aspect of the present disclosure, there is provided a power supply system including: a first power supply circuit configured to supply, to a first load device, direct-current electric power output from a first power generation device; a first power storage device connected to the first power supply circuit in parallel with the first power generation device; a second power supply circuit configured to supply, to a second load device, direct-current electric power output from a second power generation device; a second power storage device connected to the second power supply circuit in parallel with the second power generation device; a connection circuit including a connection device configured to connect the first power supply circuit and the second power supply circuit to each other; and a control device configured to execute connection control for connecting the first power supply circuit and the second power supply circuit to each other via the connection circuit, wherein the control device executes the connection control after executing a power consumption control for expedited decrease in voltage output from the second power storage device by supplying electric power from the second power storage device to the second power generation device in a case where electric power is required to be supplied from the second power generation device to the first load device and a subtraction value obtained by subtracting a voltage value of the first power supply circuit from a voltage value of the second power supply circuit exceeds a predetermined first threshold.

According to a second aspect of the present disclosure, there is provided a moving object comprising the power supply system according to the first aspect.

According to a third aspect of the present disclosure, there is provided a control method of a power supply system including: a first power supply circuit configured to supply, to a first load device, direct-current electric power output from a first power generation device; a first power storage device connected to the first power supply circuit in parallel with the first power generation device; a second power supply circuit configured to supply, to a second load device, direct-current electric power output from a second power generation device; a second power storage device connected to the second power supply circuit in parallel with the second power generation device; and a connection circuit including a connection device configured to connect the first power supply circuit and the second power supply circuit to each other; the control method including executing connection control for connecting the first power supply circuit and the second power supply circuit to each other via the connection circuit, after executing a power consumption control for expedited decrease in voltage output from the second power storage device by supplying electric power from the second power storage device to the second power generation device in a case where electric power is required to be supplied from the second power generation device to the first load device and a subtraction value obtained by subtracting a voltage value of the first power supply circuit from a voltage value of the second power supply circuit exceeds a predetermined first threshold.

According to the present invention, it is possible to provide a more satisfactory power supply system, a more satisfactory moving object including the power supply system, and a more satisfactory control method of the power supply system.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a schematic diagram of a first power generation device and a second power generation device in the present embodiment;

DETAILED DESCRIPTION OF THE INVENTION

Conventionally, as a power supply system mounted on an electric vertical take-off and landing aircraft (eVTOL aircraft), a power supply system including two power supply subsystems, namely, a first power supply subsystem and a second power supply subsystem, has been proposed.

The first power supply subsystem supplies power to the first load device. The first power supply subsystem includes a first power generation device that is a main power source, a first power storage device that is an auxiliary power source, and a first power supply circuit that supplies electric power from the first power generation device to the first load device. The second power supply subsystem supplies power to the second load device. The second power supply subsystem includes a second power generation device that is a main power source, a second power storage device that is an auxiliary power source, and a second power supply circuit that supplies electric power from the second power generation device to the second load device.

In a case where electric power cannot be supplied from the first power generation device to the first load device, electric power is supplied from the second power generation device to the first load device by connecting the first power supply subsystem and the second power supply subsystem. When the first power supply subsystem and the second power supply subsystem are connected, if the difference in voltage between the first power supply subsystem and the second power supply subsystem is relatively large, an overcurrent may flow through the power supply system.

In the present disclosure, when the first power supply circuit and the second power supply circuit are connected, it is possible to prevent an overcurrent from flowing in the power supply system. Hereinafter, the power supply system of the present disclosure will be described.

[Configuration of Power Supply System]

Figure 1:
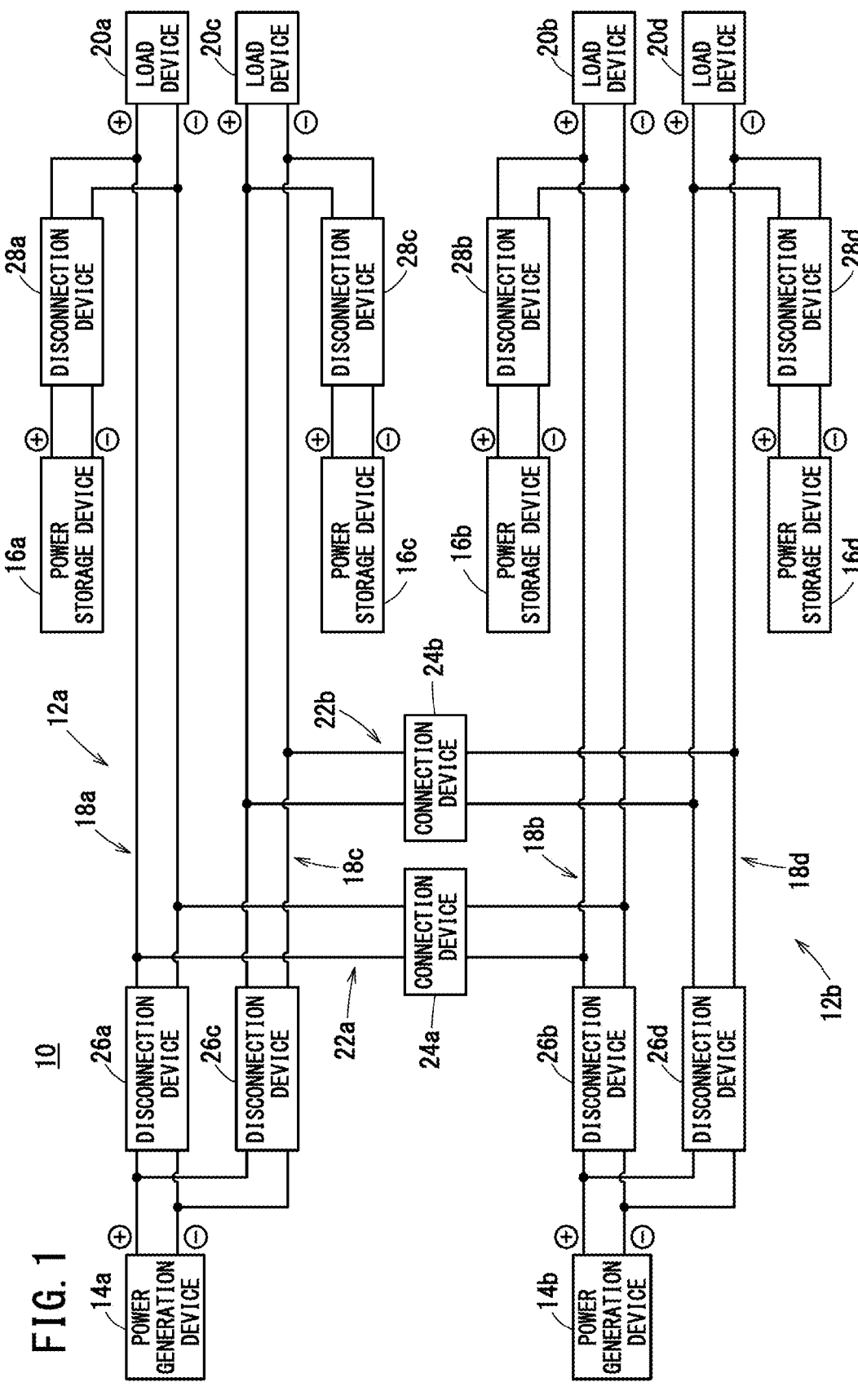
FIG. 1 is a schematic diagram of a power supply system according to a present embodiment.

FIG. 1 is a schematic diagram of a power supply system 10 according to a present embodiment. The power supply system 10 includes a first power supply subsystem 12a and a second power supply subsystem 12b. The first power supply subsystem 12a includes a first power generation device 14a serving as a main power source, and a first power storage device 16a and a third power storage device 16c serving as auxiliary power sources. The second power supply subsystem 12b includes a second power generation device 14b serving as a main power source, and a second power storage device 16b and a fourth power storage device 16d serving as auxiliary power sources.

The first power supply subsystem 12a includes a first power supply circuit 18a and a third power supply circuit 18c. The first power supply circuit 18a supplies, to a first load device 20a, DC power output from the first power generation device 14a. The third power supply circuit 18c supplies, to a third load device 20c, the DC power output from the first power generation device 14a.

The second power supply subsystem 12b includes a second power supply circuit 18b and a fourth power supply circuit 18d. The second power supply circuit 18b supplies, to a second load device 20b, DC power output from the second power generation device 14b. The fourth power supply circuit 18d supplies, to a fourth load device 20d, the DC power output from the second power generation device 14b.

Figure 2:
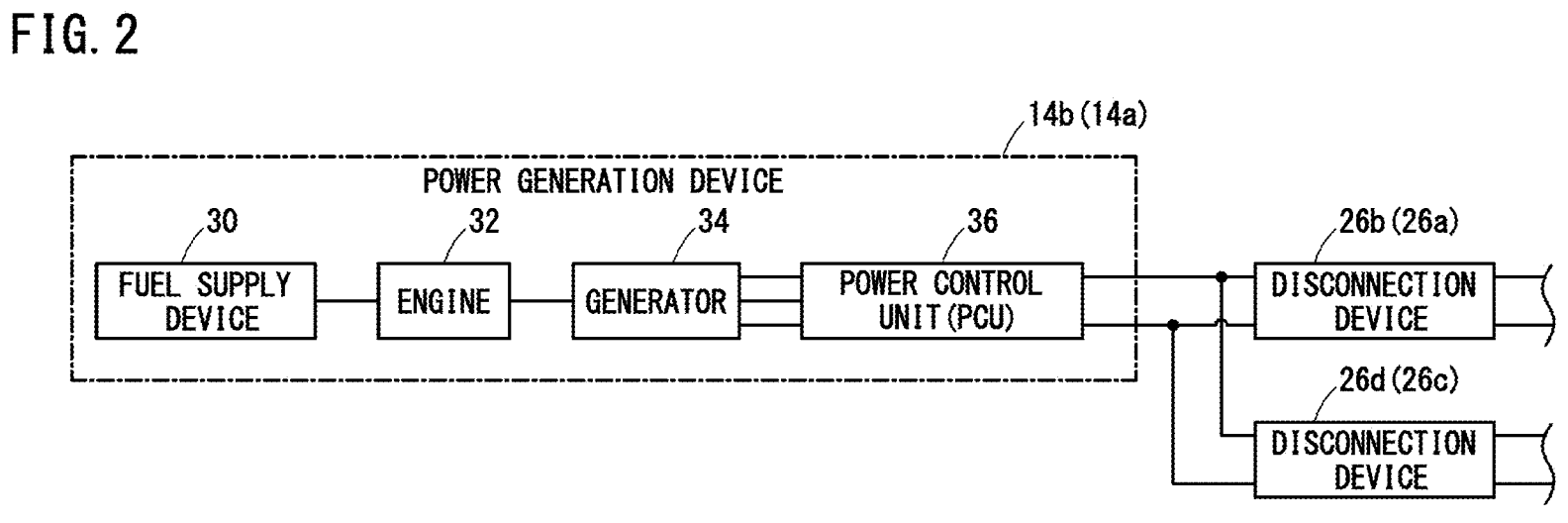

FIG. 2 is a schematic diagram of a first power generation device 14a and a second power generation device 14b in the present embodiment. The configuration of the first power generation device 14a and the configuration of the second power generation device 14b are the same. Therefore, the configuration of the second power generation device 14b will be described here, and the description of the configuration of the first power generation device 14a will be omitted.

The second power generation device 14b includes a fuel supply device 30, an engine 32, a generator 34, and a power control unit 36 (also referred to as PCU 36). The PCU 36 includes, for example, a step-up/step-down converter and an inverter. A rotation shaft of the engine 32 and a rotation shaft of the generator 34 are connected to each other. The PCU 36 is connected to the generator 34, a disconnection device 26b, and a disconnection device 26d.

The engine 32 generates torque by the fuel being supplied from the fuel supply device 30 to the engine 32. The torque generated by the engine 32 rotates the rotation shaft of the generator 34, and the generator 34 generates three-phase AC power. The PCU 36 converts the three-phase AC power into DC power, and outputs the DC power to the second power supply circuit 18b via the disconnection device 26b. Similarly, the PCU 36 outputs the DC power to the fourth power supply circuit 18d via the disconnection device 26d.

In a case where the supply of the fuel from the fuel supply device 30 to the engine 32 is stopped, the torque generated by the engine 32 becomes zero. In this state, the generator 34 is supplied with electric power from the second power supply circuit 18b or the fourth power supply circuit 18d via the PCU 36, and thus can function as an electric motor. The engine 32 becomes a load of the generator 34 functioning as an electric motor.

The first power generation device 14a and the second power generation device 14b may each include various sensors such as a voltage sensor and a current sensor, and elements such as a fuse, a relay, a breaker, a diode, a transistor, a resistor, a coil, and a capacitor.

Returning to FIG. 1, the configuration of the power supply system 10 will be further described. The first load device 20a, the second load device 20b, the third load device 20c, and the fourth load device 20d each include an inverter and an electric motor (both of them not shown). The inverter converts the input DC power into three-phase AC power, and the electric motor is driven by the three-phase AC power. The first load device 20a, the second load device 20b, the third load device 20c, and the fourth load device 20d may each include a DC/DC converter and a low-voltage drive device (both of them not shown). The DC/DC converter steps down the voltage of the input DC power, and the low-voltage drive device is driven by the DC power whose voltage has been stepped down.

The first load device 20a, the second load device 20b, the third load device 20c, and the fourth load device 20d may each include various sensors such as a voltage sensor and a current sensor, and elements such as a fuse, a relay, a breaker, a diode, a transistor, a resistor, a coil, and a capacitor.

The power supply system 10 includes a first connection circuit 22a and a second connection circuit 22b. The first connection circuit 22a includes a first connection device 24a capable of connecting the first power supply circuit 18a and the second power supply circuit 18b. The second connection circuit 22b includes a second connection device 24b capable of connecting the third power supply circuit 18c and the fourth power supply circuit 18d.

The first connection device 24a and the second connection device 24b each include a contactor. The first connection device 24a and the second connection device 24b may each include a relay. The first connection device 24a and the second connection device 24b may each include a breaker.

The first connection device 24a and the second connection device 24b may each include a semiconductor switch.

Normally, the first power supply circuit 18a and the second power supply circuit 18b are disconnected by the first connection device 24a, and the third power supply circuit 18c and the fourth power supply circuit 18d are disconnected by the second connection device 24b. That is, the first power supply subsystem 12a and the second power supply subsystem 12b are not connected to each other. Consequently, in a case where an abnormality occurs in one of the first power supply subsystem 12a or the second power supply subsystem 12b, the other can be prevented from being affected by the abnormality. For example, even when a short circuit occurs in the first power supply subsystem 12a and the first load device 20a and the third load device 20c cannot be driven, the second load device 20b and the fourth load device 20d of the second power supply subsystem 12b can continue to be driven.

In a case where the supply of electric power from the first power generation device 14a to the first power supply circuit 18a and the third power supply circuit 18c is lost, the first power supply circuit 18a and the second power supply circuit 18b are connected by the first connection device 24a. Further, the third power supply circuit 18c and the fourth power supply circuit 18d are connected by the second connection device 24b. As a result, electric power is supplied from the second power generation device 14b to the first power supply circuit 18a and the third power supply circuit 18c.

In a case where the supply of electric power from the second power generation device 14b to the second power supply circuit 18b and the fourth power supply circuit 18d is lost, the first power supply circuit 18a and the second power supply circuit 18b are connected by the first connection device 24a. Further, the third power supply circuit 18c and the fourth power supply circuit 18d are connected by the second connection device 24b. As a result, electric power is supplied from the first power generation device 14a to the second power supply circuit 18b and the fourth power supply circuit 18d.

The power supply system 10 includes a disconnection device 26a, the disconnection device 26b, a disconnection device 26c, and the disconnection device 26d. The disconnection device 26a can disconnect the first power generation device 14a from the first power supply circuit 18a and the first connection circuit 22a. The disconnection device 26b can disconnect the second power generation device 14b from the second power supply circuit 18b and the first connection circuit 22a. The disconnection device 26c can disconnect the first power generation device 14a from the third power supply circuit 18c and the second connection circuit 22b. The disconnection device 26d can disconnect the second power generation device 14b from the fourth power supply circuit 18d and the second connection circuit 22b.

The disconnection device 26a, the disconnection device 26b, the disconnection device 26c, and the disconnection device 26d each include a contactor. The disconnection device 26a, the disconnection device 26b, the disconnection device 26c, and the disconnection device 26d may each include a relay. The disconnection device 26a, the disconnection device 26b, the disconnection device 26c, and the disconnection device 26d may each include a breaker. The disconnection device 26a, the disconnection device 26b, the disconnection device 26c, and the disconnection device 26d may each include a semiconductor switch.

The first power storage device 16a is connected to the first power supply circuit 18a in parallel with the first power generation device 14a. The second power storage device 16b is connected to the second power supply circuit 18b in parallel with the second power generation device 14b. The third power storage device 16c is connected to the third power supply circuit 18c in parallel with the first power generation device 14a. The fourth power storage device 16d is connected to the fourth power supply circuit 18d in parallel with the second power generation device 14b.

The first power storage device 16a, the second power storage device 16b, the third power storage device 16c, and the fourth power storage device 16d each include a lithium ion battery. The first power storage device 16a, the second power storage device 16b, the third power storage device 16c, and the fourth power storage device 16d may each include a secondary battery other than the lithium ion battery. The first power storage device 16a, the second power storage device 16b, the third power storage device 16c, and the fourth power storage device 16d may each include a large-capacity capacitor.

The first power storage device 16a, the second power storage device 16b, the third power storage device 16c, and the fourth power storage device 16d may each include various sensors such as a voltage sensor and a current sensor, and elements such as a fuse, a relay, a breaker, a diode, a transistor, a resistor, a coil, and a capacitor.

The power supply system 10 includes a disconnection device 28a, a disconnection device 28b, a disconnection device 28c, and a disconnection device 28d. The disconnection device 28a can disconnect the first power storage device 16a from the first power supply circuit 18a and the first load device 20a. The disconnection device 28b can disconnect the second power storage device 16b from the second power supply circuit 18b and the second load device 20b. The disconnection device 28c can disconnect the third power storage device 16c from the third power supply circuit 18c and the third load device 20c. The disconnection device 28d can disconnect the fourth power storage device 16d from the fourth power supply circuit 18d and the fourth load device 20d.

The disconnection device 28a, the disconnection device 28b, the disconnection device 28c, and the disconnection device 28d each include a contactor. The disconnection device 28a, the disconnection device 28b, the disconnection device 28c, and the disconnection device 28d may each include a relay. The disconnection device 28a, the disconnection device 28b, the disconnection device 28c, and the disconnection device 28d may each include a breaker. The disconnection device 28a, the disconnection device 28b, the disconnection device 28c, and the disconnection device 28d may each include a semiconductor switch.

As shown in FIG. 1, the first load device 20a and the third load device 20c are connected in parallel. Further, the first power generation device 14a and the first power storage device 16a are connected in parallel. Furthermore, the first power generation device 14a and the third power storage device 16c are connected in parallel. Therefore, if voltage drop in the first power supply circuit 18a and the third power supply circuit 18c is considered to be sufficiently small, the output voltage of the first power generation device 14a, the output voltage of the first power storage device 16a, the output voltage of the third power storage device 16c, the voltage applied to the first load device 20a, and the voltage applied to the third load device 20c are substantially equal to each other. Hereinafter, the output voltage of the first power generation device 14a, the output voltage of the first power storage device 16a, the output voltage of the third power storage device 16c, the voltage applied to the first load device 20*a*, and the voltage applied to the third load device 20*c* may be collectively referred to as the voltage of the first power supply subsystem 12*a*. A value of the voltage of the first power supply circuit 18*a*; that is, a value of the voltage of the first power supply subsystem 12*a* is referred to as a voltage value Va.

Similarly, the output voltage of the second power generation device 14*b*, the output voltage of the second power storage device 16*b*, the output voltage of the fourth power storage device 16*d*, the voltage applied to the second load device 20*b*, and the voltage applied to the fourth load device 20*d* are substantially equal to each other. Hereinafter, the output voltage of the second power generation device 14*b*, the output voltage of the second power storage device 16*b*, the output voltage of the fourth power storage device 16*d*, the voltage applied to the second load device 20*b*, and the voltage applied to the fourth load device 20*d* may be collectively referred to as the voltage of the second power supply subsystem 12*b*. A value of the voltage of the second power supply circuit 18*b*; that is, a value of the voltage of the second power supply subsystem 12*b* is referred to as a voltage value Vb.

[Operation of Power Supply System in Normal State]

Figure 3:
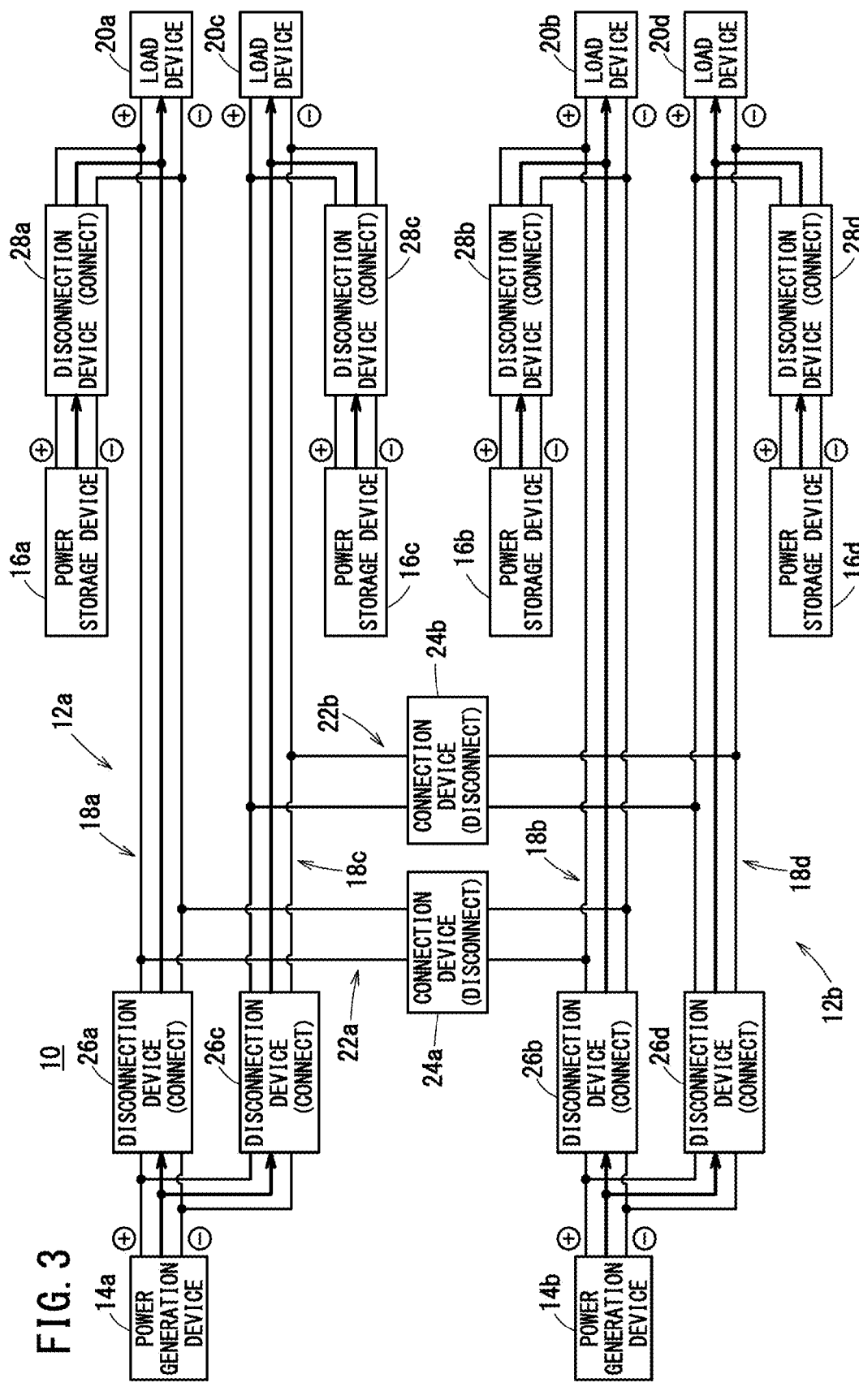
FIG. 3 is a diagram showing the operation of the power supply system of the present embodiment in the normal state.

FIG. 3 is a diagram showing the operation of the power supply system 10 of the present embodiment in the normal state. Arrows shown in FIG. 3 indicate electric power supply paths.

The connection between the first power supply circuit 18*a* and the second power supply circuit 18*b* is interrupted by the first connection device 24*a*, and the connection between the third power supply circuit 18*c* and the fourth power supply circuit 18*d* is interrupted by the second connection device 24*b*.

The first power generation device 14*a* is connected to the first power supply circuit 18*a* and the first connection circuit 22*a* by the disconnection device 26*a*, and the first power generation device 14*a* is connected to the third power supply circuit 18*c* and the second connection circuit 22*b* by the disconnection device 26*c*. As a result, electric power is supplied from the first power generation device 14*a* to the first load device 20*a* and the third load device 20*c*.

The first power storage device 16*a* is connected to the first load device 20*a* by the disconnection device 28*a*, and electric power is supplied from the first power storage device 16*a* to the first load device 20*a*. The third power storage device 16*c* is connected to the third load device 20*c* by the disconnection device 28*c*, and electric power is supplied from the third power storage device 16*c* to the third load device 20*c*.

The second power generation device 14*b* is connected to the second power supply circuit 18*b* and the first connection circuit 22*a* by the disconnection device 26*b*, and the second power generation device 14*b* is connected to the fourth power supply circuit 18*d* and the second connection circuit 22*b* by the disconnection device 26*d*. As a result, electric power is supplied from the second power generation device 14*b* to the second load device 20*b* and the fourth load device 20*d*.

The second power storage device 16*b* is connected to the second load device 20*b* by the disconnection device 28*b*, and electric power is supplied from the second power storage device 16*b* to the second load device 20*b*. The fourth power storage device 16*d* is connected to the fourth load device 20*d* by the disconnection device 28*d*, and electric power is supplied from the fourth power storage device 16*d* to the fourth load device 20*d*.

[Operation of Power Supply System in Event of Abnormality]

Figure 4:
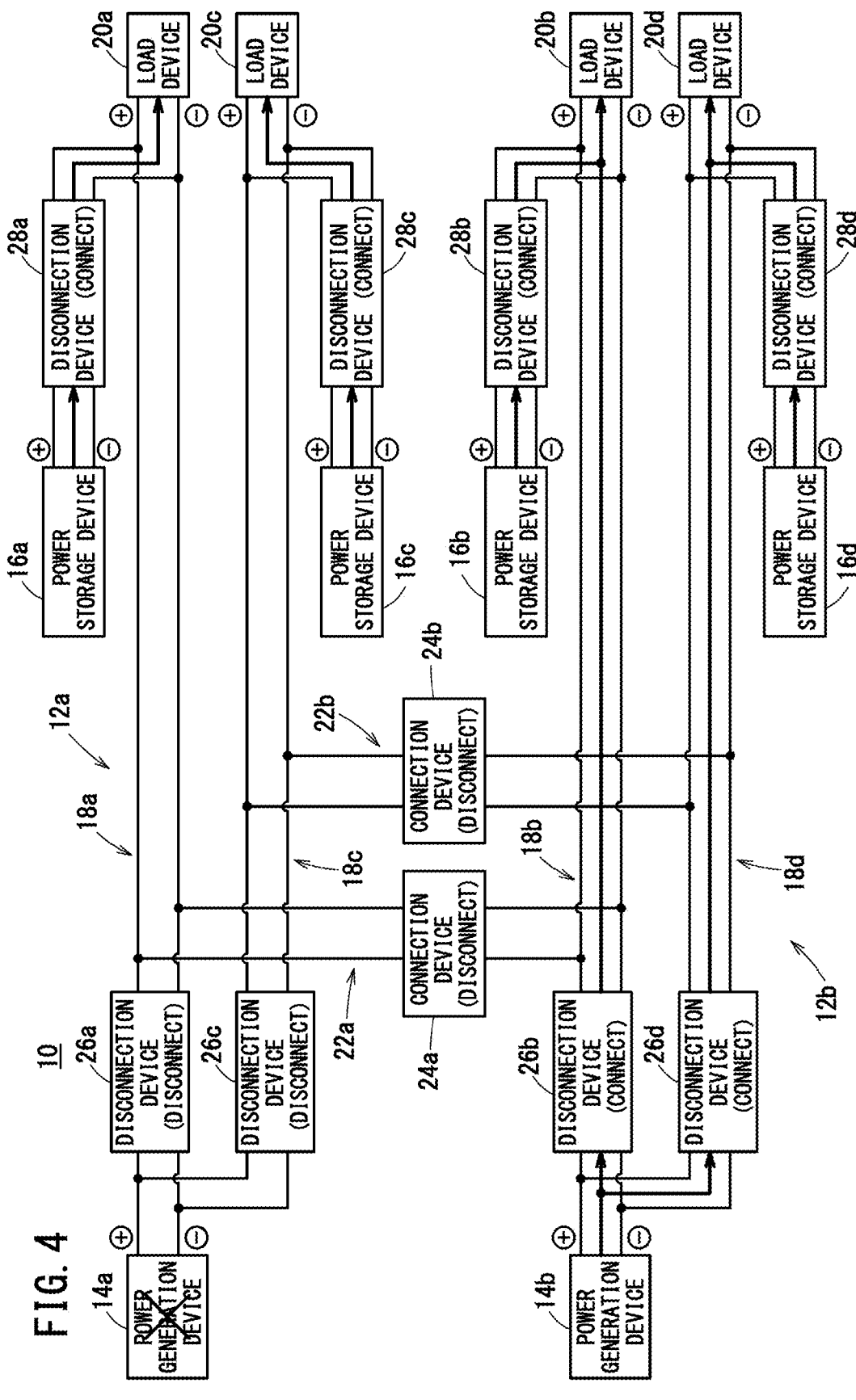
FIG. 4 is a diagram showing the operation of the power supply system of the present embodiment in the event of an abnormality.
Figure 5:
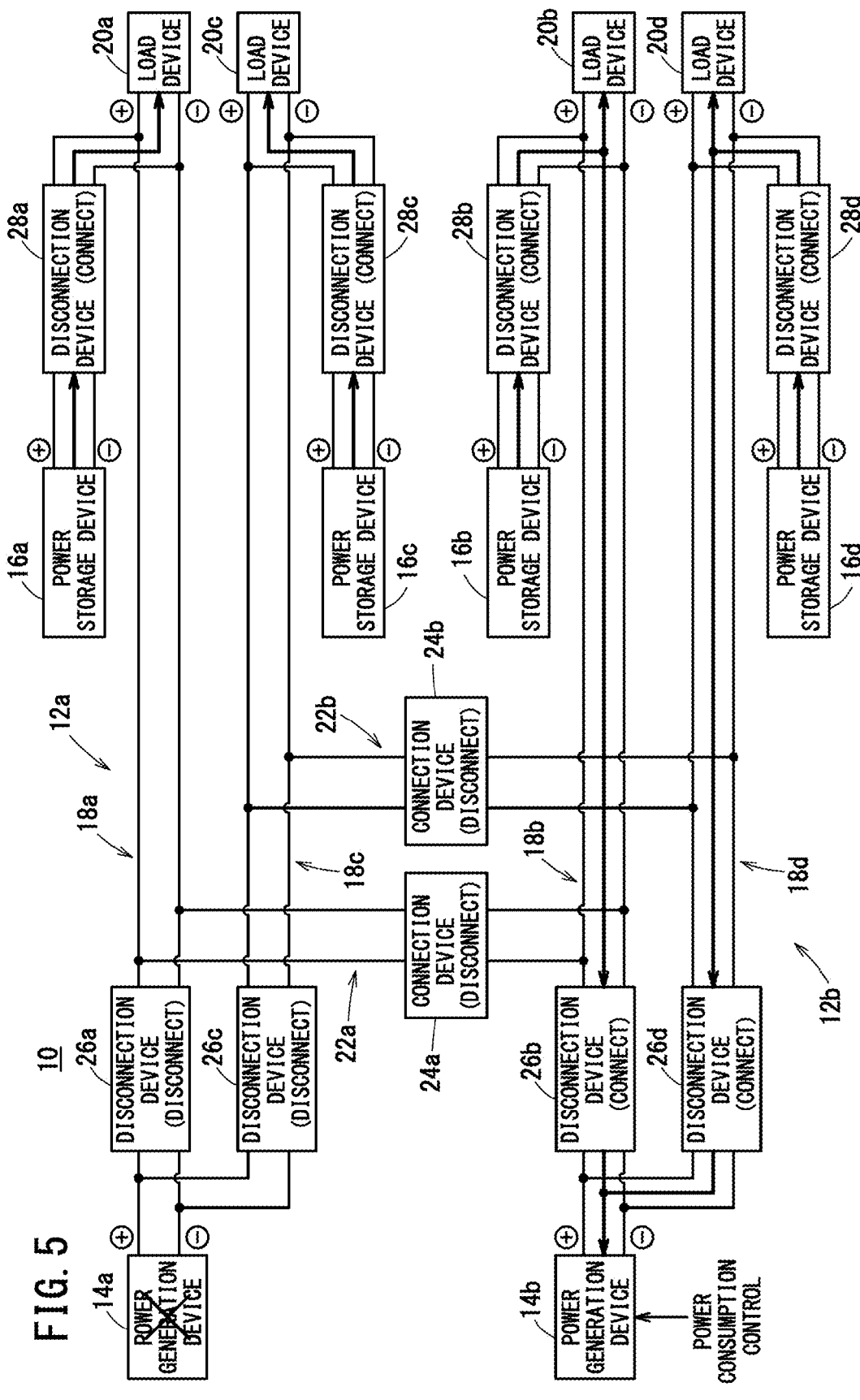
FIG. 5 is a diagram showing the operation of the power supply system of the present embodiment in the event of an abnormality.
Figure 6:
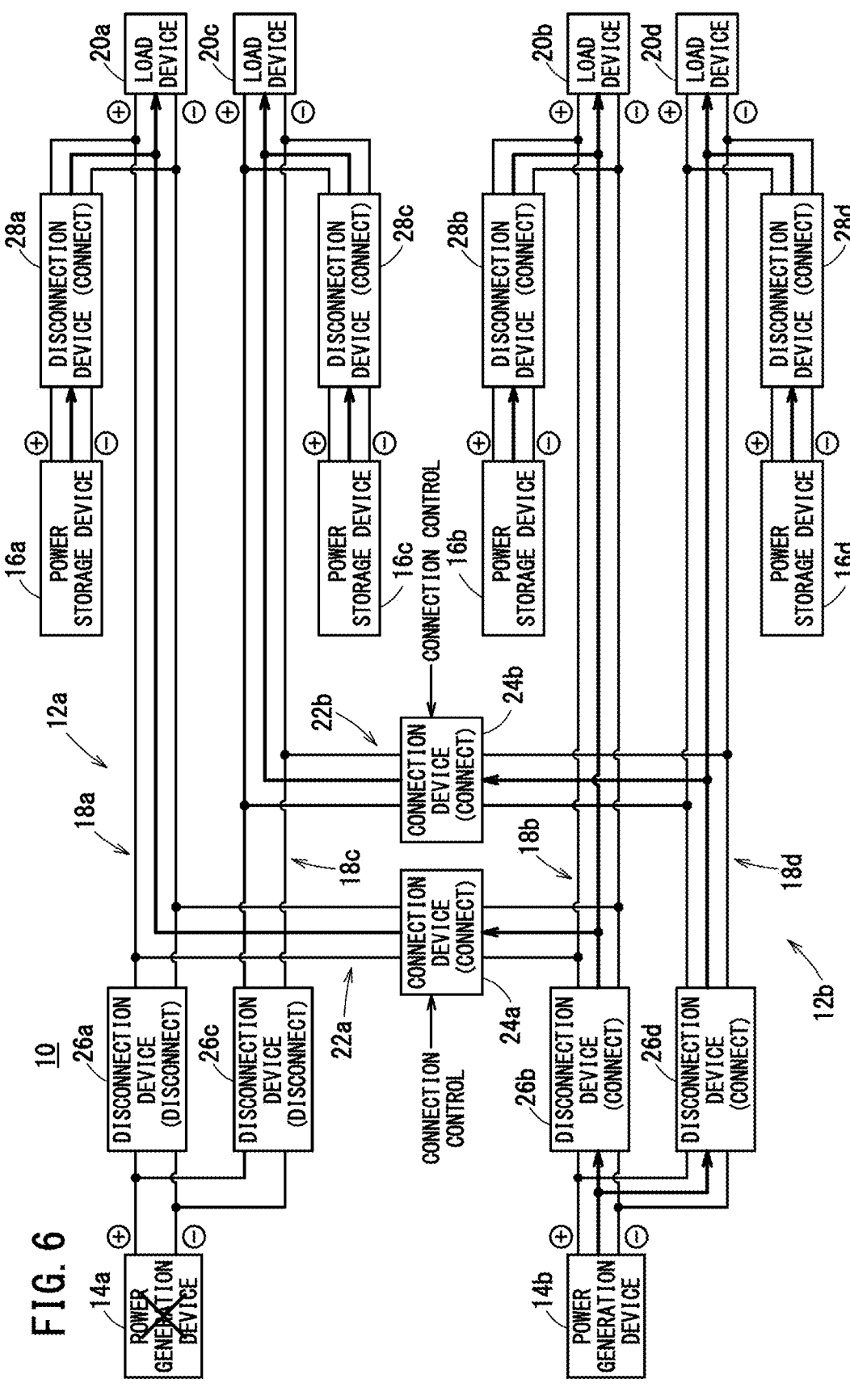
FIG. 6 is a diagram showing the operation of the power supply system of the present embodiment in the event of an abnormality.

Each of FIGS. 4 to 6 is a diagram showing the operation of the power supply system 10 of the present embodiment in the event of an abnormality. Arrows shown in FIGS. 4 to 6 indicate electric power supply paths. FIGS. 4 to 6 show the operation of the power supply system 10 in a case where the supply of electric power from the first power generation device 14*a* to the first power supply circuit 18*a* and the third power supply circuit 18*c* is lost.

The state in which the supply of electric power from the first power generation device 14*a* to the first power supply circuit 18*a* and the third power supply circuit 18*c* is lost is, for example, a state in which the first power generation device 14*a* is stopped and cannot be restarted, or a state in which a short circuit, wire breaking (disconnection), or the like has occurred between the first power generation device 14*a* and the disconnection device 26*a*, and between the first power generation device 14*a* and the disconnection device 26*c*.

In a case where the supply of electric power from the first power generation device 14*a* to the first power supply circuit 18*a* and the third power supply circuit 18*c* is lost, then as shown in FIG. 4, the first power generation device 14*a* is disconnected from the first power supply circuit 18*a* and the first connection circuit 22*a* by the disconnection device 26*a*. Further, the first power generation device 14*a* is disconnected from the third power supply circuit 18*c* and the second connection circuit 22*b* by the disconnection device 26*c*.

In the case where the value (Vb−Va) obtained by subtracting the voltage value Va of the first power supply subsystem 12*a* from the voltage value Vb of the second power supply subsystem 12*b* is larger than the threshold (first threshold, second threshold) Vth, the power supply system 10 performs control to supply electric power from the second power storage device 16*b* and the fourth power storage device 16*d* to the second power generation device 14*b*, as shown in FIG. 5. In this specification, this control is referred to as power consumption control. In the present specification, a value obtained by subtracting the voltage value Va from the voltage value Vb is referred to as a subtraction value Vs. The threshold Vth is stored beforehand in a storage unit 42 to be described later. For example, the threshold Vth is a voltage value corresponding to allowable current flowing through the first connection circuit 22*a* and the second connection circuit 22*b*. The power consumption control is performed to expedited decrease in voltage output from the second power storage device 16*b* and the fourth power storage device 16*d*.

The power consumption control is performed to reduce the gap between the voltage value Va of the first power supply subsystem 12*a* and the voltage value Vb of the second power supply subsystem 12*b*. The power consumption control and the process for reducing the gap between the voltage value Va of the first power supply subsystem 12*a* and the voltage value Vb of the second power supply subsystem 12*b* will be described in detail later.

After making the voltage value Va of the first power supply subsystem 12*a* and the voltage value Vb of the second power supply subsystem 12*b* close to each other, the power supply system 10 performs connection control on the first connection device 24*a* and performs the connection control on the second connection device 24*b*, as shown in FIG. 6. As a result, the first power supply circuit 18*a* and the second power supply circuit 18*b* are connected by the first connection device 24*a*, and the third power supply circuit 18c and the fourth power supply circuit 18d are connected by the second connection device 24b. Therefore, electric power is supplied from the second power generation device 14b to the first power supply circuit 18a and the third power supply circuit 18c.

[Configuration of Control Device]

Figure 7:
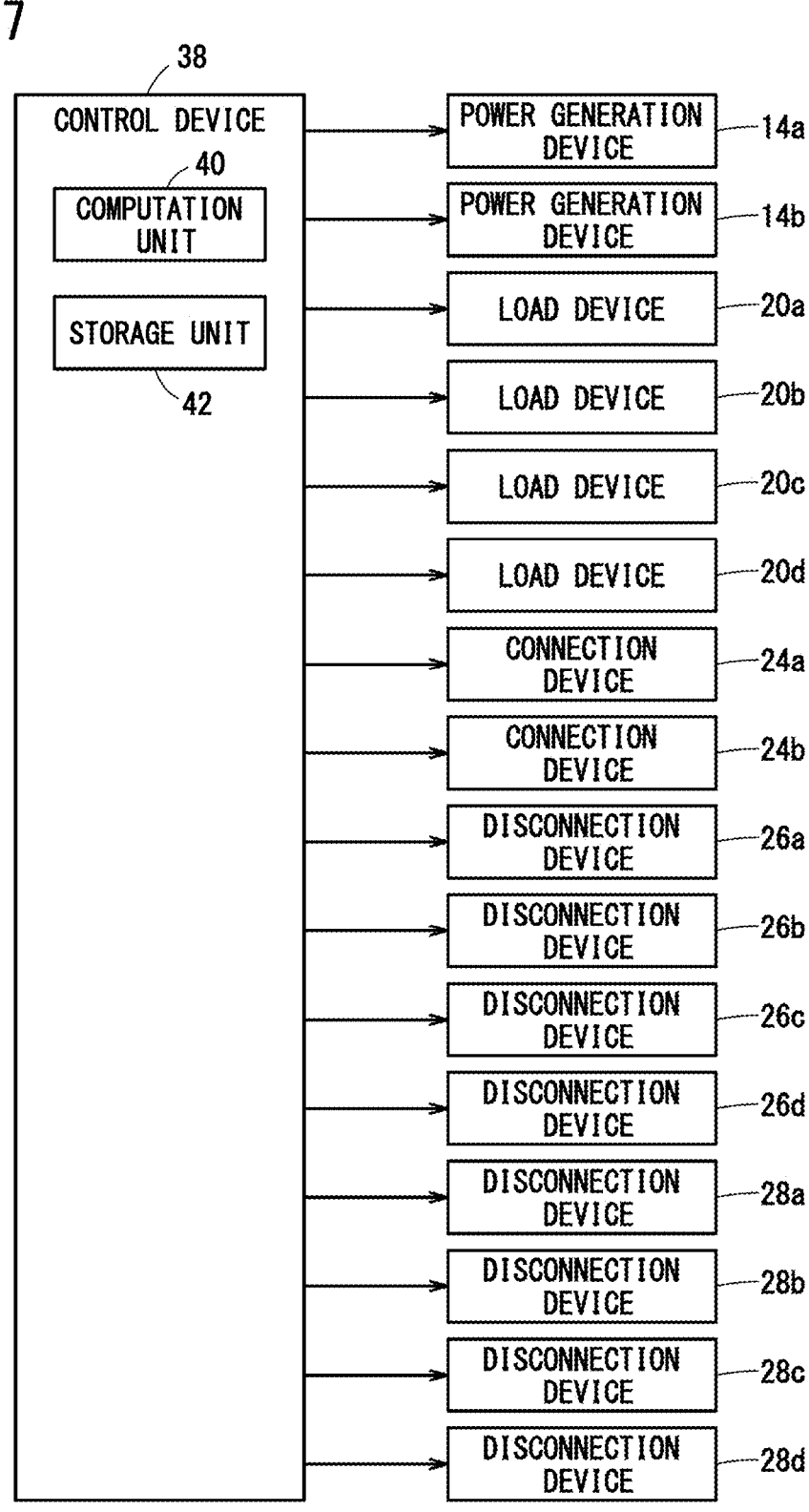
FIG. 7 is a control block diagram of a control device in the present embodiment.

The power supply system 10 includes a control device 38. FIG. 7 is a control block diagram of the control device 38 in the present embodiment.

The control device 38 includes a computation unit 40 and the storage unit 42. The computation unit 40 includes a processor such as a CPU (Central Processing Unit) or a GPU (Graphics Processing Unit) or the like. The computation unit 40 controls each of respective devices by executing a program that is stored in the storage unit 42. At least a portion of the computation unit 40 may be realized by an integrated circuit such as an ASIC (Application Specific Integrated Circuit) or an FPGA (Field-Programmable Gate Array) or the like. At least a portion of the computation unit 40 may be realized by an electronic circuit including a discrete device.

The storage unit 42 may be made up of a volatile memory (not shown), and a non-volatile memory (not shown), as a computer-readable storage medium. The volatile memory, for example, is a RAM (Random Access Memory) or the like. As the non-volatile memory, there may be cited, for example, a ROM (Read Only Memory), a flash memory, or the like. Data, etc. may be stored in the volatile memory, for example. A program, a table, a map and the like are stored, for example, in the non-volatile memory. At least a portion of the storage unit 42 may be provided in the above-described processor, the integrated circuit, or the like.

The control device 38 controls each of the first power generation device 14a, the second power generation device 14b, the first load device 20a, the second load device 20b, the third load device 20c, the fourth load device 20d, the first connection device 24a, the second connection device 24b, the disconnection device 26a, the disconnection device 26b, the disconnection device 26c, the disconnection device 26d, the disconnection device 28a, the disconnection device 28b, the disconnection device 28c, and the disconnection device 28d. A plurality of control devices 38 may control the first power generation device 14a, the second power generation device 14b, the first load device 20a, the second load device 20b, the third load device 20c, the fourth load device 20d, the first connection device 24a, the second connection device 24b, the disconnection device 26a, the disconnection device 26b, the disconnection device 26c, the disconnection device 26d, the disconnection device 28a, the disconnection device 28b, the disconnection device 28c, and the disconnection device 28d. For example, one control device 38 may control the first power generation device 14a, the second power generation device 14b, the first load device 20a, the second load device 20b, the third load device 20c, the fourth load device 20d, and another control device 38 may control the first connection device 24a, the second connection device 24b, the disconnection device 26a, the disconnection device 26b, the disconnection device 26c, the disconnection device 26d, the disconnection device 28a, the disconnection device 28b, the disconnection device 28c, and the discon-nection device 28d

[Fail-Safe Control]

Figure 8:
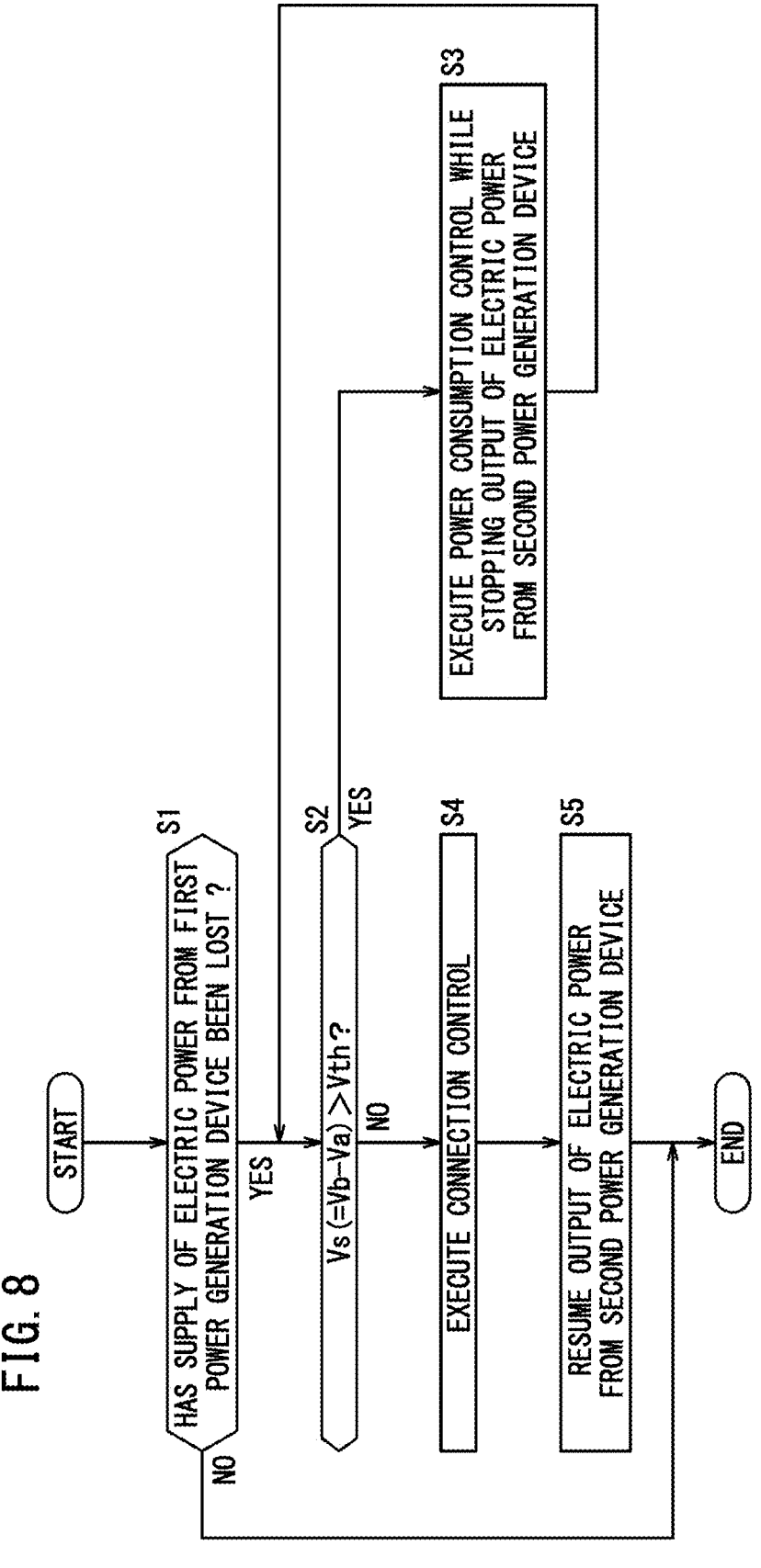
FIG. 8 is a flowchart showing fail-safe control of the present embodiment.

FIG. 8 is a flowchart showing fail-safe control of the present embodiment. The fail-safe control is repeatedly executed at a predetermined cycle. FIG. 8 shows a process for dealing with an abnormal state in which electric power is not supplied from the first power generation device 14a to the first power supply circuit 18a and the third power supply circuit 18c, as described with reference to FIG. 4. The process for dealing with another abnormal state in which electric power is not supplied from the second power generation device 14b to the second power supply circuit 18b and the fourth power supply circuit 18d can also be performed in the same manner as the process shown in FIG. 8.

In step S1, the control device 38 determines whether or not the supply of electric power from the first power generation device 14a to the first power supply circuit 18a and the third power supply circuit 18c has been lost. In a case where it is determined that the supply of electric power from the first power generation device 14a to the first power supply circuit 18a and the third power supply circuit 18c has been lost (step S1: YES), the process proceeds to step S2. On the other hand, in a case where it is determined that the supply of electric power from the first power generation device 14a to the first power supply circuit 18a and the third power supply circuit 18c has not been lost (step S1: NO), the process of the fail-safe control is ended.

Upon transitioning from step S1 to step S2, the control device 38 compares, with the threshold Vth, a subtraction value Vs obtained by subtracting the voltage value Va of the first power supply subsystem 12a from the voltage value Vb of the second power supply subsystem 12b. If the subtraction value Vs is larger than the threshold Vth (step S2: YES), the process proceeds to step S3. On the other hand, when the subtraction value Vs is equal to or less than the threshold Vth (step S2: NO), the process proceeds to step S4.

Upon transitioning from step S2 to step S3, the control device 38 controls the second power generation device 14b to stop outputting electric power. For example, the control device 38 controls the fuel supply device 30 to stop sup-plying fuel to the engine 32. As a result, the torque generated by the engine 32 becomes zero, and the generator 34 stops outputting electric power. Further, the control device 38 executes the power consumption control in a state where the output of the electric power from the generator 34 is stopped. For example, the control device 38 controls the switching elements of the PCU 36 in such a manner that electric power is supplied from the second power storage device 16b and the fourth power storage device 16d to the generator 34. The generator 34 rotates the rotation shaft of the engine 32 by being supplied with electric power. In this state, the torque generated by the engine 32 is maintained at zero. In this way, by operating the generator 34 as a motor, the power supply system 10 consumes the electricity stored in the second power storage device 16b and the fourth power storage device 16d. Following step S3, the control device 38 performs the determination in step S2. The control device 38 repeats the process of step S3 until the subtraction value Vs becomes equal to or less than the threshold Vth.

Upon transitioning from step S2 to step S4, the control device 38 performs the connection control on each of the first connection device 24a and the second connection device 24b. Thus, the first power supply circuit 18a and the second power supply circuit 18b are connected by the first connection device 24a. Further, the third power supply circuit 18c and the fourth power supply circuit 18d are connected by the second connection device 24b. After the connection control is performed, the process transitions to step S5.

In step S5, the control device 38 resumes the output of electric power from the second power generation device 14b. The control device 38 controls the fuel supply device 30 to resume the fuel supply to the engine 32. Then, the engine 32 drives the generator 34, and the generator 34 outputs DC power.

In the fail-safe control shown in FIG. 8, the threshold (first threshold) Vth used by the control device 38 for determining whether the power consumption control is started is also used by the control device 38 for determining whether the power consumption control is terminated (step S2). The present embodiment is not limited to the above. The control device 38 may use a first threshold for determining whether to start the power consumption control, and may use a second threshold, which is smaller than the first threshold, for determining whether to end the power consumption control.

[Reducing Gap Between Voltage Values of First Power Supply Subsystem and Second Power Supply Subsystem]

In the power supply system 10, in a case where there is a certain difference between the voltage value Va of the first power supply subsystem 12a and the voltage value Vb of the second power supply subsystem 12b, the voltage value Va of the first power supply subsystem 12a and the voltage value Vb of the second power supply subsystem 12b are made close to each other before the first power supply subsystem 12a and the second power supply subsystem 12b are connected. The following explanation will be made by taking, as an example, the power supply system 10 in the state shown in FIG. 4 where electric power supply from the first power generation device 14a to the first power supply circuit 18a and the third power supply circuit 18c is lost. Hereinafter, the time at which electric power supply from the first power generation device 14a to the first power supply circuit 18a and the third power supply circuit 18c is lost is referred to as a time point of loss of power.

At the time point of loss of power, the magnitude relationship between the voltage value Va of the first power supply subsystem 12a and the voltage value Vb of the second power supply system 12b falls within one of the following (a) to (c):

(a) The difference between the voltage value Va and the voltage value Vb is equal to or less than the threshold Vth (Va−Vb≤Vth);

(b) The voltage value Va is larger than the voltage value Vb, and the difference therebetween is larger than the threshold Vth (Va−Vb>Vth); and (c) The voltage value Vb is larger than the voltage value Va, and the difference therebetween is larger than the threshold value Vth (Vb−Va>Vth).

In the case of (a) above, even if the connection control is performed on the first connection device 24a and the second connection device 24b, the first connection circuit 22a and the second connection circuit 22b will not suffer from an overcurrent. Therefore, the control device 38 performs the connection control of the first connection device 24a and the connection control of the second connection device 24b at the time point of loss of power.

In the case of (b) above, if the connection control is performed on the first connection device 24a and the second connection device 24b at the time point of loss of power, the first connection circuit 22a and the second connection circuit 22b will suffer from an overcurrent. Therefore, the control device 38 does not perform the connection control on the first connection device 24a and the second connection device 24b at the time point of loss of power.

However, in the case of (b) above, after the time point of loss of power, as the SOC (State of Charge) of the first power storage device 16a and the SOC of the third power storage device 16c decrease with the passage of time, the voltage value Va of the first power supply subsystem 12a decreases. On the other hand, the voltage value Vb of the second power supply subsystem 12b, to which electric power supply from the second generation device 14b is not lost, is maintained at a predetermined value or more. Therefore, the difference between the voltage value Va and the voltage value Vb becomes equal to or less than the threshold Vth with the passage of time. That is, in the case of (b) above, after a certain period of time, the relationship between the voltage value Va and the voltage value Vb comes to fall within the case of (a) above. In the case of (b) above, the control device 38 performs the connection control on the first connection device 24a and the second connection device 24b at the time point when the relationship falls within the case of (a) above.

In the case of (c) above, if the connection control is performed on the first connection device 24a and the second connection device 24b at the time point of loss of power, the first connection circuit 22a and the second connection circuit 22b will suffer from an overcurrent, as in the case of (b) above. As described in the case of (b) above, the voltage value Va of the first power supply subsystem 12a decreases after the time point of loss of power. Therefore, with the passage of time, the difference between the voltage value Va and the voltage value Vb becomes larger than the difference at the time point of loss of power. In the case where the control device 38 determines that the relationship falls in the case of (c) above (YES in step S2 in FIG. 8), the control device 38 lowers the voltage value Vb. After the difference between the voltage value Va and the voltage value Vb is sufficiently reduced, the control device 38 performs the connection control on the first connection device 24a and the connection control of the second connection device 24b.

Figures 9A, 9B, 9C, 9D:
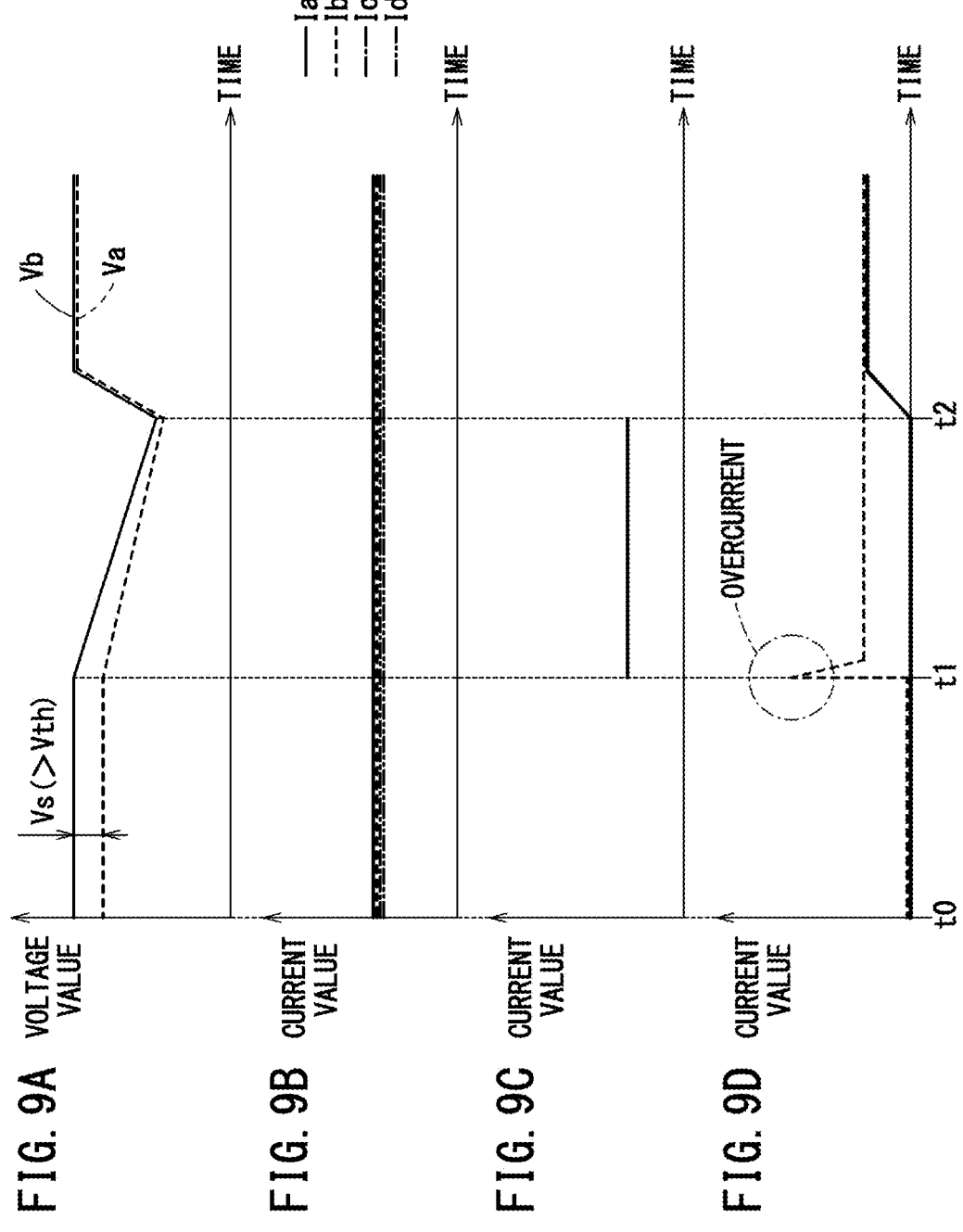
FIG. 9A, FIG. 9B, FIG. 9C and FIG. 9D are graphs each showing a temporal change in the state of the power supply system in the time periods before and after the time point at which the first power supply subsystem and the second power supply subsystem are connected.

FIGS. 9A to 9D are graphs each showing a temporal change in the state of the power supply system 10 in periods before and after a time point at which the first power supply subsystem 12a and the second power supply subsystem 12b are connected. The graph of FIG. 9A shows a temporal change in the voltage value Va of the first power supply subsystem 12a and a temporal change in the voltage value Vb of the second power supply subsystem 12b. The graph of FIG. 9B shows a temporal change in the value Ia of current flowing through the first load device 20a, a temporal change in the value Ib of current flowing through the second load device 20b, a temporal change in the value Ic of current flowing through the third load device 20c, and a temporal change in the value Id of current flowing through the fourth load device 20d. The graph in FIG. 9C shows a temporal change in the value of current supplied to the second power generation device 14b. The graph of FIG. 9D shows a temporal change in the value of current flowing through the first connection circuit 22a (and the second connection circuit 22b) in the case where the power consumption control is not executed, and a temporal change in the value of current flowing through the first connection circuit 22a (and the second connection circuit 22b) in the case where the power consumption control is executed. In each of the graphs of FIGS. 9A to 9D, temporal changes in the voltage and current are schematically shown.

As shown in FIG. 9A, in the period from time t0 to time t1, the subtraction value Vs obtained by subtracting the voltage value Va from the voltage value Vb is larger than the threshold Vth. At time t1, the supply of electric power from the first power generation device 14a is lost. Time t1 is the time point of loss of power. If the connection control is performed on the first connection device 24a and the second connection device 24b at time t1, the first connection circuit 22a and the second connection circuit 22b will suffer from an overcurrent as indicated by the broken line in FIG. 9D.

In order to avoid an overcurrent, the control device 38 starts executing the power consumption control at time point t1 (step S3 in FIG. 8). Then, in the power supply system 10, the electric power is supplied as shown in FIG. 5. In this state, the first power storage device 16a supplies electric power to the first load device 20a. The third power storage device 16c supplies electric power to the third load device 20c. The second power storage device 16b supplies electric power to the second load device 20b. The fourth power storage device 16d supplies electric power to the fourth load device 20d. As shown in FIG. 9B, the current value Ia of the first power storage device 16a, the current value Ic of the third power storage device 16c, the current value Ib of the second power storage device 16b, and the current value Id of the fourth power storage device 16d are substantially the same.

Further, as shown in FIG. 9C, the second power storage device 16b and the fourth power storage device 16d supply electric power to the second power generation device 14b. Therefore, the amount of electric power discharged from the second power storage device 16b and the fourth power storage device 16d becomes larger than the amount of electric power discharged from the first power storage device 16a and the third power storage device 16c. In other words, the rate of decrease in the SOC of the second power storage device 16b and the fourth power storage device 16d is higher than the rate of decrease in the SOC of the first power storage device 16a and the third power storage device 16c. That is, as shown in FIG. 9A, the rate of decrease in the voltage value Vb is higher than the rate of decrease in the voltage value Va after time t1. At time t2, the difference between the voltage value Va and the voltage value Vb becomes equal to or less than the threshold Vth.

At time t2, the control device 38 ends the power consumption control, and performs the connection control on the first connection device 24a and the second connection device 24b (step S4 in FIG. 8). Then, as shown in FIG. 9D, at time t2, no overcurrent flows through the first connection circuit 22a and the second connection circuit 22b.

According to the present embodiment, the voltage value Vb of the second power supply subsystem 12b and the voltage value Va of the first power supply subsystem 12a can be made close to each other by executing the power consumption control. Therefore, according to the present embodiment, in the case where the first power supply circuit 18a and the second power supply circuit 18b are connected via the first connection circuit 22a and the second connection circuit 22b, it is possible to prevent an overcurrent from flowing through the first connection circuit 22a and the second connection circuit 22b.

According to the present embodiment, the electric power supplied from the second power storage device 16b and the fourth power storage device 16d is consumed by the second power generation device 14b, and thus the voltage value Vb of the second power supply subsystem 12b can be reduced regardless of the consumption of the electric power in each load device. In other words, according to the present embodiment, each load device can be operated regardless of the power consumption control.

[Configuration of Moving Object]

Figure 10:
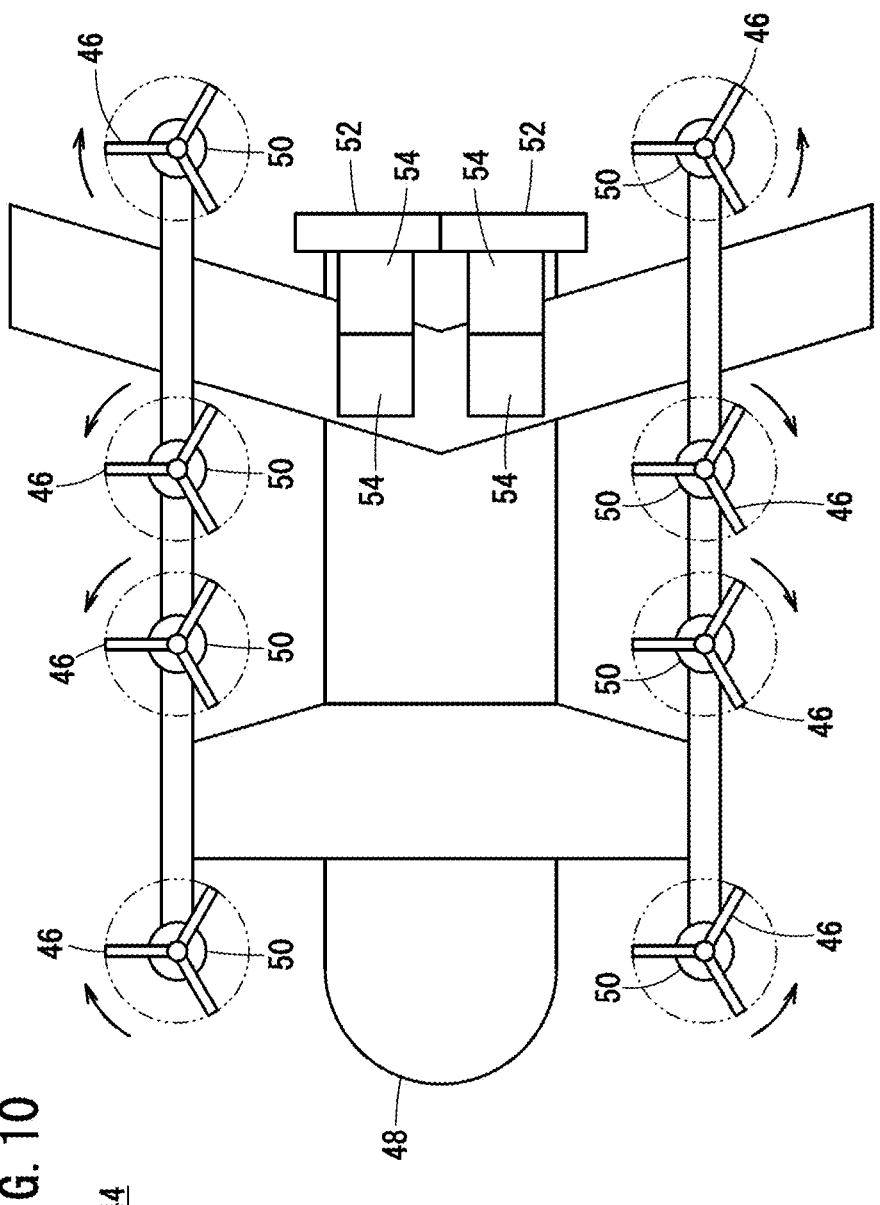
FIG. 10 is a schematic view of a moving object.
Figure 10:
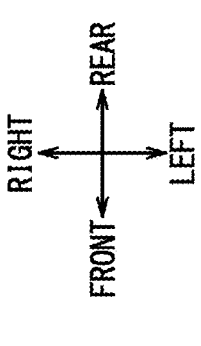

FIG. 10 is a schematic view of a moving object 44. The power supply system 10 is mounted in the moving object 44.

The moving object 44 of the present embodiment is an electric vertical take-off and landing aircraft (eVTOL aircraft). The moving object 44 includes eight VTOL rotors 46.

The VTOL rotors 46 generate upward thrust for a fuselage 48. The moving object 44 includes eight electric motors 50. One electric motor 50 drives one VTOL rotor 46. The moving object 44 includes two cruise rotors 52. The cruise rotors 52 generate forward thrust for the fuselage 48. The moving object 44 includes four electric motors 54. Two of the electric motors 54 drive one of the cruise rotors 52.

Each of the first load device 20a, the second load device 20b, the third load device 20c, and the fourth load device 20d may include two electric motors 50 and one electric motor 54. Each of the first load device 20a, the second load device 20b, the third load device 20c, and the fourth load device 20d may include a low-voltage drive device in addition to the electric motors 50 and the electric motors 54.

The moving object 44 is not limited to an aircraft, and may be a ship, an automobile, a train, or the like.

[Supplementary Note]

In relation to the above-described disclosure, the following supplementary notes are further disclosed.

Supplementary Note 1

The power supply system (10) according to the present disclosure including: the first power supply circuit (18a) configured to supply, to the first load device (20a), direct-current electric power output from the first power generation device (14a); the first power storage device (16a) connected to the first power supply circuit in parallel with the first power generation device; the second power supply circuit (18b) configured to supply, to the second load device (20b), direct-current electric power output from the second power generation device (14b); the second power storage device (16b) connected to the second power supply circuit in parallel with the second power generation device; the connection circuit (22a) including the connection device (24a) configured to connect the first power supply circuit and the second power supply circuit to each other; and the control device (38) configured to execute connection control for connecting the first power supply circuit and the second power supply circuit to each other via the connection circuit, wherein the control device executes the connection control after executing the power consumption control for expedited decrease in voltage output from the second power storage device by supplying electric power from the second power storage device to the second power generation device in the case where electric power is required to be supplied from the second power generation device to the first load device and the subtraction value (Vs) obtained by subtracting the voltage value (Va) of the first power supply circuit from the voltage value (Vb) of the second power supply circuit exceeds the predetermined first threshold (Vth).

According to the configuration of Supplementary Note 1, the voltage value of the second power supply circuit and the voltage value of the first power supply circuit can be made close to each other by executing the power consumption control. Therefore, according to the configuration of Supplementary Note 1, it is possible to prevent an overcurrent from flowing through the connection circuit connecting the first power supply circuit and the second power supply circuit. As described above, according to the configuration of Supplementary Note 1, a more favorable power supply system can be provided.

According to the configuration of Supplementary Note 1, since the electric power supplied from the second power storage device is consumed at the second power generation device, the voltage value of the second power supply circuit can be reduced regardless of the consumption of the electric power by each load device. In other words, according to the present embodiment, each load device can be operated regardless of the power consumption control. As described above, according to the configuration of Supplementary Note 1, a more favorable power supply system can be provided.

Supplementary Note 2

In the power supply system according to Supplementary Note 1, the control device may be configured to execute the connection control after executing the power consumption control until the subtraction value becomes smaller than the predetermined second threshold value in the case where electric power is required to be supplied from the second power generation device to the first load device and the subtraction value exceeds the first threshold.

Supplementary Note 3

In the power supply system according to Supplementary Note 1, the control device may stop outputting electric power from the second power generation device while the power consumption control is being executed.

Supplementary Note 4

In the power supply system according to Supplementary Note 3, the control device may resume outputting electric power from the second power generation device after executing the connection control.

Supplementary Note 5

The moving object (44) of the present disclosure includes the power supply system according to any one of Supplementary Notes 1 to 4.

According to the configuration described in Supplementary Note 5, the moving object having a more favorable power supply system can be provided.

Supplementary Note 6

The control method according to the present disclosure for the power supply system including: the first power supply circuit configured to supply, to the first load device, direct-current electric power output from the first power generation device; the first power storage device connected to the first power supply circuit in parallel with the first power generation device; the second power supply circuit configured to supply, to the second load device, direct-current electric power output from the second power generation device; the second power storage device connected to the second power supply circuit in parallel with the second power generation device; and the connection circuit including the connection device configured to connect the first power supply circuit and the second power supply circuit to each other; the control method including: executing the power consumption control for expedited decrease in voltage output from the second power storage device by supplying electric power from the second power storage device to the second power generation device in the case where electric power is required to be supplied from the second power generation device to the first load device and the subtraction value obtained by subtracting the voltage value of the first power supply circuit from the voltage value of the second power supply circuit exceeds the predetermined first threshold; and after executing the power consumption control, executing connection control for connecting the first power supply circuit and the second power supply circuit to each other via the connection circuit.

According to the configuration described in Supplementary Note 6, it is possible to provide a more favorable control method of a power supply system.

Although the present disclosure has been described in detail, the present disclosure is not limited to the above-described individual embodiments. These embodiments may be subjected to various additions, substitutions, modifications, partial deletions and the like, within a range that does not deviate from the essence and gist of the present disclosure, or the spirit of the present disclosure as derived from the contents described in the claims and equivalents thereof. Further, the embodiments can also be implemented together in combination. For example, in the above-described embodiments, the order of each of the operations and the order of each of the processes are illustrated as examples, and the present invention is not necessarily limited to these features. The same also applies to cases in which numerical values or mathematical expressions are used in the description of the aforementioned embodiments.

The invention claimed is:

1. A power supply system comprising:
a first power supply circuit configured to supply, to a first load device, direct-current electric power output from a first power generation device;
a first power storage device connected to the first power supply circuit in parallel with the first power generation device;
a second power supply circuit configured to supply, to a second load device, direct-current electric power output from a second power generation device;
a second power storage device connected to the second power supply circuit in parallel with the second power generation device;
a connection circuit including a connection device configured to connect the first power supply circuit and the second power supply circuit to each other; and
a control device comprising one or more processors that execute computer-executable instructions stored in a memory,
wherein the one or more processors execute the computer-executable instructions to cause the control device to:
execute a power consumption control for expedited decrease in voltage output from the second power storage device by supplying electric power from the second power storage device to the second power generation device in a case where electric power is required to be supplied from the second power generation device to the first load device and a subtraction value obtained by subtracting a voltage value of the first power supply circuit from a voltage value of the second power supply circuit exceeds a predetermined first threshold; and
after executing the power consumption control, execute connection control for connecting the first power supply circuit and the second power supply circuit to each other via the connection circuit.

2. The power supply system according to claim 1, wherein the one or more processors cause the control device to:
execute the connection control after executing the power consumption control until the subtraction value becomes smaller than a predetermined second threshold in the case where electric power is required to be supplied from the second power generation device to the first load device and the subtraction value exceeds the first threshold.

3. The power supply system according to claim 1, wherein the one or more processors cause the control device to:
stop outputting electric power from the second power generation device while the power consumption control is being executed.

4. The power supply system according to claim 3, wherein the one or more processors cause the control device to:
resume outputting electric power from the second power generation device after executing the connection control.

5. A moving object comprising the power supply system according to claim 1.

6. A control method of a power supply system, the power supply system comprising:

a first power supply circuit configured to supply, to a first load device, direct-current electric power output from a first power generation device;

a first power storage device connected to the first power supply circuit in parallel with the first power generation device;

a second power supply circuit configured to supply, to a second load device, direct-current electric power output from a second power generation device;

a second power storage device connected to the second power supply circuit in parallel with the second power generation device; and a connection circuit including a connection device configured to connect the first power supply circuit and the second power supply circuit to each other;

the control method comprising:

executing a power consumption control for expedited decrease in voltage output from the second power storage device by supplying electric power from the second power storage device to the second power generation device in a case where electric power is required to be supplied from the second power generation device to the first load device and a subtraction value obtained by subtracting a voltage value of the first power supply circuit from a voltage value of the second power supply circuit exceeds a predetermined first threshold; and after executing the power consumption control, executing connection control for connecting the first power supply circuit and the second power supply circuit to each other via the connection circuit.

\* \* \* \* \*